United States Patent [19]

Bagg et al.

[11] Patent Number: 5,318,763

[45] Date of Patent: Jun. 7, 1994

[54] PROCESS FOR PREPARING DINITROGEN PENTOXIDE

[75] Inventors: Greville E. G. Bagg, Waltham Abbey; Anthony W. Arber, Waltham Cross, both of England

[73] Assignee: The Secretary of State for Defence in Her Britannic Majesty's Government of the United Kingdom of Great Britain and Northern Ireland, London, England

[21] Appl. No.: 847,033

[22] PCT Filed: Jul. 25, 1991

[86] PCT No.: PCT/GB91/01250

§ 371 Date: Apr. 17, 1992

§ 102(e) Date: Apr. 17, 1992

[87] PCT Pub. No.: WO92/02452

PCT Pub. Date: Feb. 20, 1992

[30] Foreign Application Priority Data

Aug. 4, 1990 [GB] United Kingdom ............... 9017134

[51] Int. Cl.⁵ .............................................. C01B 2/20
[52] U.S. Cl. ...................................................... 423/400
[58] Field of Search ........................................ 423/400

[56] References Cited

U.S. PATENT DOCUMENTS

| | | | |
|---|---|---|---|
| 4,432,902 | 2/1984 | McGuire et al. | 423/400 |
| 5,128,001 | 7/1992 | Bagg et al. | 423/400 |

FOREIGN PATENT DOCUMENTS

| | | | |
|---|---|---|---|
| 13968 | of 1908 | United Kingdom | 423/400 |
| 1143 | of 1911 | United Kingdom | 423/400 |
| 131334 | 8/1919 | United Kingdom | 423/400 |

Primary Examiner—Wayne Langel
Attorney, Agent, or Firm—Nixon & Vanderhye

[57] ABSTRACT

Process for producing dinitrogen pentoxide ($N_2O_5$) consists of reacting a solution of dinitrogen tetroxide ($N_2O_4$) in a volatile organic solvent, with a stream of an ozone-containing carrier gas. $N_2O_5$ produced by reaction between the $N_2O_4$ and ozone is transferred into the gas stream, and is thereafter condensed out of the gas stream by contact with further inert organic solvent. The latent heat of formation of $N_2O_5$ is absorbed by the heat of vaporization of the solvent, so limiting increases in reaction temperature and suppressing the dissociation of the $N_2O_5$. In a preferred embodiment the reaction and absorption steps are performed in separate columns having organic solvent recalculating continuously through each with carrier gas flowing continuously from the reaction column to the absorption column.

17 Claims, 1 Drawing Sheet

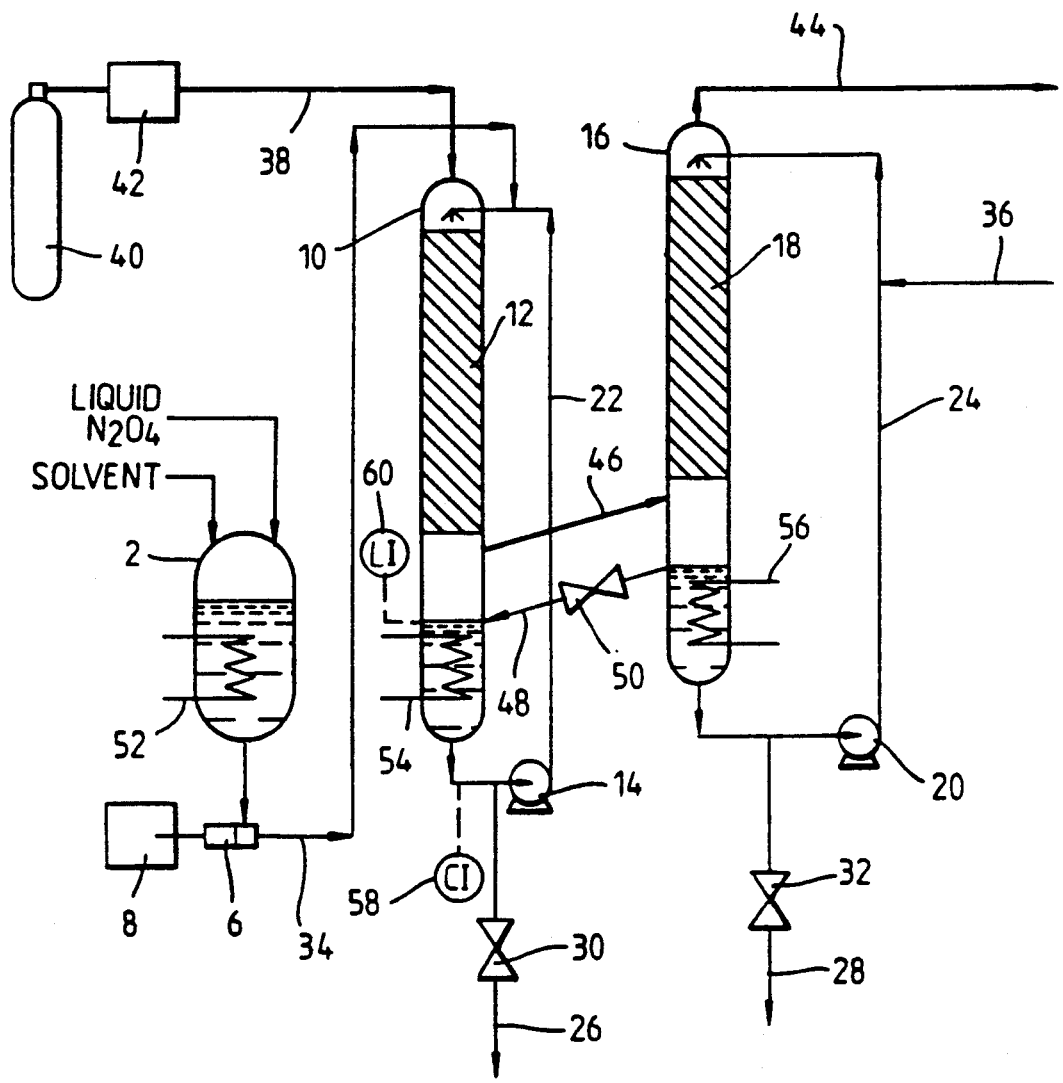

PROCESS FOR PREPARING DINITROGEN PENTOXIDE

This invention relates to the preparation of dinitrogen pentoxide ($N_2O_5$) by the reaction between dinitrogen pentoxide ($N_2O_4$) and ozone.

$N_2O_5$ is a powerful and selective nitrating agent, especially when dissolved in inert organic solvents. Hitherto, its use as a nitrating agent has been limited because of its relatively high cost and lower thermal stability.

One process of $N_2O_5$ preparation which is capable of producing a high purity product with a relatively long shelf life is the reaction of gaseous $N_2O_4$ with ozone. Ozone is produced at a maximum concentration of about 4 wt% in oxygen within a silent electrical discharge ozoniser, and is immediately reacted with a stoichiometric amount of $N_2O_4$ vapour in an inert gas carrier to give $N_2O_5$. The inert gas stream containing the $N_2O_5$ product is then brought into contact with a cold surface maintained at a low temperature of typically $-70°$ C. to condense out the product as a solid, whilst at the same time minimizing losses.

There are several disadvantages with this process. These are:
1. Since the concentration of ozone in the carrier gas stream is very low, the volume of carrier gas is high in comparison with the volume of gaseous $N_2O_5$ product. The potential for product losses in the carrier gas is therefore high, which is one reason for employing a very low recovery temperature.
2. The reaction between $N_2O_4$ and ozone is exothermic, which has a detrimental effect in the thermally unstable $N_2O_5$ product.
3. The recovered product is a solid which is difficult to transport, store, and use.
4. A very low product recovery temperature of typically $-70°$ C. must be used, which leads to high operating costs especially since the high volume of carrier gas must also be cooled to the same temperature.
5. The product is condensed onto a cold surface whose thermal efficiency falls as the thickness of product builds up.
6. The maintenance of a stoichiometric ratio of $N_2O_4$ and ozone is difficult to achieve, especially when these reagents are present in such low concentrations. A slight excess of ozone is lost in the carrier gas which adds to operating costs, whereas a slight excess of $N_2O_4$ leads to $N_2O_4$ contamination in the condensed product.
7. Any water vapour present in the ozone/gas stream from the ozoniser produces nitric acid contamination in the product by reaction with $N_2O_5$.

It is an object of the present invention in a first aspect to provide a process for generating $N_2O_5$ by reaction between ozone and $N_2O_4$ whereby the aforementioned disadvantages are overcome or at least mitigated in part.

Accordingly, a process for preparing $N_2O_5$ comprises the steps of (a) providing a solution of $N_2O_4$ in a first body of a volatile inert organic solvent, (b) contacting the solution with a carrier gas containing ozone at a temperature sufficient to promote formation of $N_2O_5$ in, and evaporation of solvent into, the carrier gas, (c) contacting the $N_2O_5$-laden carrier gas with a second body of inert organic solvent at a temperature below that of step (b) to condense the $N_2O_5$ therein, and (d) recovering the condensed $N_2O_5$ within the solvent from step (c).

FIG. 1 of the Drawing represents an apparatus for carrying out the process according to the present invention.

The principal advantage of the gas/liquid interaction in step (b) is that the heat generated during the exothermic reaction between ozone and $N_2O_4$ in step (b) is both absorbed by intimate contact with liquid solvent of relatively high specific heat capacity and counteracted by the latent heat of vaporization of the solvent and $N_2O_4$. In this way, large temperature increases are suppressed and thermal decomposition of the $N_2O_5$ avoided. Although this means that the carrier gas becomes contaminated with solvent vapour, step (c) provides an effective means of recovering this solvent by low temperature condensation into the second body of solvent whilst at the same time directly converting the $N_2O_5$ into readily storable, transportable and usable form without an intermediate solids handling stage.

The chemical identity of the first and second bodies of solvent are preferably the same to avoid the problem of one solvent contaminating the other. Preferably, this solvent comprises $C_1$ or $C_2$ chloroalkane, especially dichloromethane, or a chlorofluorocarbon, especially a $C_1$ or $C_2$ chlorofluorocarbon.

A further advantage of producing $N_2O_5$ in step (b) is that any moisture introduced within the carrier gas (which preferably comprises ozonised oxygen or ozonised air) hydrates some of the $N_2O_5$ and becomes trapped as relatively involatile nitric acid condensate within the liquid solvent product of step (b). This obviates the need to provide a very dry source of carrier gas. If however the carrier gas is essentially moisture free then the produce of step (b) will not be contaminated with bniric acid, and since it too will contain some dissolved $N_2O_5$ this solvent produce may be blended with the $N_2O_5$-containing solvent of step (d) to form the principal product of the present method.

The carrier gas used in step (b) preferably contains a stoichiometric excess of ozone of preferably up to 5%, more preferably from 0.5 to 2%, over that required to venerate the $N_2O_5$. Any excess ozone present in the carrier gas is carried over to and at least partly absorbed by the second body of insert solvent, the the result that it prolongs the shelf life of then$_2$O$_5$ in the product solvent by reconverting its principal product of thermal decomposition ($N_2O_4$) back into $N_2O_5$.

Step (b) is preferably performed within the temperature range $-20°$ C. to $+30°$ c., more preferably $-15°$ C. to $+20°$ C., and most preferably at a temperature at which $N_2O_4$ remains strongly colored in solution so that its complete removable from solution can be detected by the absence of color using, for example, colourimetric detection means. Strong solution colouration by $N_2O_4$ is observed at temperatures at or above $-15°$ C., especially at temperatures at or above $-10°$ C. At or above these temperatures $N_2O_5$ in solution is essentially colorless and so its presence in solution does not interfere with the colourimetric detection of $N_2O_4$. However, at temperatures above $+20°$ C. the $N_2O_5$ becomes increasingly thermally unstable and so a maximum temperature of $+10°$ C. is preferred in order to promote a reasonable rate of solvent and nitrogen oxide evaporation.

The carrier gas and first body of solvent are preferably contacted in co-current flow to promote continuous and efficient formation of $N_2O_5$ in the gas phase. Co-current flow ensures that the concentrations of ozone and $N_2O_4$ in the carrier gas and solvent respectively are at a maximum at the beginning of co-current flow contact and at a minimum at the end of that contact. The first body of solvent is preferably continuously recirculate in a closed loop to acilitare its replenishment with low concentrations of fresh $N_2O_4$ and to facilitate the transfer of $N_2O_5$ into the gas phase. In order to provide a large surface area of intimate contact between the first body of solvent and the carrier gas and to promote rapid vaporization of $N_2O_4$ and solvent, step (b) is conveniently conducted in a first packed column.

Step (c) is preferably conducted at a temperature of $-156°$ C. or less, preferably $-20°$ C. or less, in order to ensure substantially complete recovery of $N_2O_5$ from h carrier gas. At temperatures below $-50°$ C. no significant improvement in $N_2O_5$ and ozone removable from the carrier gas occurs, but since the vapour pressure of the solvent steadily declines with decreasing temperature so that amount of solvent recovered from the gas into the second body of inert solvent increases and this in turn obviates the need for a subsequent solvent recovery step. For this reason, step (c) may be performed at temperatures typically as low as $-70°$ C. though at the expense of increased cooling costs and increased amounts of crystalline $N_2O_5$ formed in solution. In order to promote efficient recovery of $N_2O_5$ from the carrier gas, the carrier gas and the second body of inert organic solvent are preferably contacted in continuous countercurrent flow, most preferably within a second packed column. This has the added advantage of minimising the temperature of, and hence the solvent vapour concentration in, the spent carrier gas. As with the first body of solvent, the second body of solvent is preferably continuously recirculated in a closed loop to facilitate its reuse in step (c) and to promote the build-up of a high concentration of $N_2O_5$ therein.

The carrier gas is preferably provided as a single stream which contacts the first and second bodies of solvent in sequence.

The concentration of ozone in the carrier gas is preferably at least 0.1 wt% and will not normally exceed 4 wt%. In order to promote complete reaction between the ozone and $N_2O_4$, it is preferable that the concentration of $N_2O_4$ in the solvent is carefully controlled to ensure that the vapour pressure of $N_2O_4$ is approximately equal to the vapour pressure of ozone at the commencement of step (b). This requires that the average concentration of $N_2O_5$ in the solvent is preferably between 0.005 and 0.05 wt% and is more preferably between 0.01 and 0.02 wt%. close control over $N_2O_4$ concentration can be maintained by continuously or intermittently adding $N_2O_4$ at a known rate to the first body of solvent recalculating in a closed loop. The $N_2O_4$ is preferably added as a concentrated solution of typically between 25 and 60 wt% in the same organic solvent as that of the first body so as to make up for solvent losses by evaporation into the carrier gas.

In a second aspect of the present invention, there is provided an apparatus for performing the process of the first aspect comprising a reaction vessel having an ozone generation means a solvent supply means connected thereto, an absorber vessel having a cooling means connected thereto and having a gas vent and a solvent product outlet extending therefrom, and a carrier gas transfer line connecting between the reaction and absorber vessels.

The apparatus preferably further includes a first solvent recirculation means connecting between a solvent inlet and a solvent outlet of the reaction vessel, and a second solvent recirculation means connecting between a solvent inlet and a solvent outlet of the absorber vessel.

The ozone generation and solvent supply means are preferably connected in co-current flow to the reaction vessel whereas the solvent inlet and gas transfer lines to the absorber vessel and preferably connected in countercurrent flow. Each vessel preferably comprises a packed column.

Examples of the present invention will now be described with reference to the following apparatus and process descriptions and to the accompanying drawing The apparatus illustrated in FIG. 1 comprises a feedstock reservoir 2, a metering pump 6 with a motor 8, a reactor column 10 containing packed section 12, a reactor column recirculation pump 14, an absorber column 16 containing a packed section 18, and an absorber column recirculation pump 20.

A reactor solvent recirculation line 22 extends between the bottom and top of the reactor column 10 through the reactor column recirculation pump 14. Similarly, an absorber solvent recirculation line 24 extends between the bottom and top of the absorber column 16 through the absorber recirculation pump 20. Each of the reactor and absorber recirculation lines has a product offtake line 26 and 28 respectively fitted with a valve 30 and 32 respectively. A feedstock transfer line 34 connects between the reservoir 2 nd the reactor recirculation line 22 through the metering pump 6. A solvent makeup line 36 connects with the absorber recirculation line 24.

A gas inlet line 38 extends from an oxygen supply 40, through an ozone generator 42 nd into the top of the reactor column 10. At the top of the absorber column 16 is a gas outlet line 44. The two columns are connected below their respective packed sections by a gas transfer line 46, and a liquid return line 48 having a valve 50. The absorber column 16 is mounted slightly higher than the reactor column 10 to allow excess liquid collected in the bottom o the absorber column to overflow into the reactor column through the return line 48 when the valve 50 is open.

Cooling coils 52, 54 and 56 are fitted, respectively, in the reservoir 2, in the bottom of the reactor column 10 and in the bottom of the absorber column 16 for controlling the temperature of the solvent at various parts of the apparatus.

A. BATCH PROCESS (SEMI-CONTINUOUS)
Process Description

1. With the equipment dry and purged with nitrogen to remove all traces of moisture, a quantity of moisture-free inert organic solvent is charged to the reactor column 10 and the absorber column 16.

2. The absorber column circulation pump 20 is switched on and the temperature of the solvent in the absorber column 16 brought down to below $-15°$ C. using the cooling coil 56, the actual temperature selected being set by the partial pressures of the components in the gas stream to minimize process and solvent losses. The reactor column recirculation pump 14 is also switched on. Valves 30 and 32 are kept closed and valve 50 is kept open.

3. The oxygen stream is then switched on from its source 40 to reduce the temperature of the solvent in the reaction column by evaporation, and the ozone generator 42 brought into operation and adjusted for optimum conditions. The ozone-containing oxygen stream passes down the packed section 12 of the reactor column 10 in co-current flow with reactor column solvent, through the gas transfer line 46, up the packed section 18 of the absorber column 16 in countercurrent flow with absorber solvent, and out through the gas outlet line 44.

4. Using the metering pump 6, the $N_2O_4$ solution in the reservoir 2 is continuously metered into the circulating solvent of the reactor column 10 and thereby flows down the packed column co-currently with the ozonised gas stream. The relative flow rate of $N_2O_4$ and ozone through the reactor column are selected to ensure that ozone is always present in stoichiometric excess. Contact between solvent and gas streams causes a proportion of the ozone to dissolve into the liquid phase and react exothermically with the $N_2O_4$ to give $N_2O_5$ in solution. At the same time some of the $N_2O_4$ and solvent vaporises, the vaporized $N_2O_4$ then immediately reacting exothermically with the ozone in the as stream to produce more $N_2O_5$. The effect of metering the $N_2O_4$ solvent into solvent recalculating within a closed circuit is to keep the $N_2O_4$ concentration in the solvent entering the reaction column very low (typically between 0.01 and 0.02 wt%) to maintain a low $N_2O_4$ partial pressure so that its concentration released into the gas stream by vaporization is approximately equal tot the low concentration of ozone present in the gas stream. The gas and liquid flow int h reactor column 10 is co-current. This ensures that a the concentrations of the reactive components (ozone and $N_2O_4$) in these two streams are at a maximum at their point of contact and at a minimum when the streams separate and permits maximum contact time for the reaction to take place. In this way, complete reaction between the ozone and $N_2O_4$ is promoted, losses are minimized, and the liberated heat of reaction between the $N_2O_4$ and ozone can be effectively and progressively counteracted by the cooling effect produced any the evaporation of the solvent and the $N_2O_4$ so as to suppress thermal decomposition of the $N_2O_5$ once formed. Any water vapour present int the gas stream reacts with $N_2O_5$ to form nitric acid, which being relatively involatile condenses out in the reactor column solvent.

5. By appropriate use of the cooling coils 52 and 54, the temperature within the packed section 12 of the reactor column 10 is maintained at a temperature above that which $N_2O_4$ and $N_2O_5$ are effectively stripped out of solution (typically above $-10°$ C.) and yet within a temperature range in which $N_2O_4$ in solution is strongly colored brown. Thus, color indicator 58 is used to adjust the speed of the pump 6 to ensure the flow of $N_2O_4$ in solution to the reactor column 10 is lower than which causes a brown colouration in the solvent at the base of the column. This in turn means that the required excess of ozone is present in the gas stream since all the $N_2O_4$ is being converted to $N_2O_5$. the required concentration of the $N_2O_4$ solution in the reservoir is calculated with the assistance of the level indicator 60 to ensure that the flow rate of solvent pumped through the pump 6 matches the rate of solvent evaporation into theg as stream which is equivalent to a constant solvent level indication in the reactor column 10.

6. In the packed section 18 o the absorber column 16, the gas stream, now laden with $N_2O_5$ and saturated with solvent, contacts the recalculating low temperature absorber solvent in countercurrent flow. This causes the $N_2O_5$, solvent, and excess ozone components within the gas stream to condense out into the solvent. Countercurrent flow ensures that the temperature of the gas, and thus the concentration of each of these components, is at a minimum as the gas leaves the column. As a safety measure, any excess solvent carried over from the reactor column 10 to the absorber column 16 is allowed to return under gravity through the valve 50. This prevents accidental build-up to excess solvent within the absorber column 16.

7. When the required quantity of $N_2O_5$ has been prepared, as judged by a mass balance to give a final solution concentration at a desirable level for subsequent usage, the ozone generator 42 is turned off together with the oxygen source 40 and the metering pump 6. The equipment is then allowed to warm up (typically to between $-20°$ C. and $0°$ C.) to ensure that any crystals of $N_2O_5$ formed in the absorber column 16 redissolve in the solvent. The hue 32 is then opened ad the $N_2O_5$ solution in the absorber column 16 drawn off through the offtake line 28.

8. The solution in the reactor column 6, if it is not contaminated with nitric acid, can be drawn of through the offtake line 26 with valve 30 open and blended with the solution from the absorber column.

9. The equipment can then be recharged with fresh solvent and the process repeated.

EXAMPLE 1

Batch (Semi-Continuous)

$N_2O_4$ (5kg) was dissolved in dichloromethane (5kg), to give a 50 wt% feedstock which was metered in to the absorber column at 0.38 kg per hour.

The reactor and absorber columns were charged with dichloromethane (41kg).

Solvent was recirculated through each column in a closed loop at a rate, typically 1200 kg per hour, calculated to be above the minimum wetting conditions and below the flooding conditions for the packed column used.

Oxygen was feed through the ozone generator to give 2 wt% ozone at an ozone flowrate of 100 g/hr.

With the reactor column at $0°$ C. and absorber column at $-50°$ C., the reaction was complete after approximately 26 hours.

The product output from the absorber column was a 12 wt% $N_2O_5$ solution (40 kg) containing 0.2 wt% nitric acid.

The solution output from the reactor column was a 6 wt% $N_2O_5$ solution (8 kg) containing 2 wt% nitric acid.

Typical vent losses were $N_2O_5$ (0.1 kg) and dichloromethane (1.5 kg).

Typical system losses (ie remaining within system) were $N_2O_5$ (0.3 kg) and dichloromethane (2 kg).

B. CONTINUOUS WITH VALVE 50 CLOSED

Process Description

1. Process steps 1 to 6 of the batch (semi-continuous) process are performed as described above, except that product is taken off continuously through line 28 with valve 32 open, and fresh dry solvent is continuously added through line 36 as required in order to maintain the concentration of $N_2O_5$ in the product as necessary.

2. The continuous process may be shut down intermittently if and when an unacceptably high concentration of nitric acid builds up in the solvent within the reactor column, to be replaced by fresh acid-free solvent. The pump 6 is first switched off and reaction and evaporation within the reactor column allowed to continues of a shot wile to remove all trace of $N_2O_4$ and $N_2O_5$ from the solvent. Thereafter, the oxygen source 40, ozone generator 42 and recirculation pump 20 are switched off and the nitric acid-laden solvent in the reactor column 19 is drained out through the offtake line (with valve 30 open) for subsequent solvent recovery. Fresh dry solvent is then changed to the reactor column 19, and the continuous process restarted.

EXAMPLE 2

Continuous with Valve 50 closed

Feedstock consisting of 50 wt% $N_2O_4$ in dichloromethane was metered into the reaction column at 0.38 kg/hr.

The reactor and absorber columns were charged with dichloromethane (41 kg) which was recirculated at 1200 kg/hr through each column.

Oxygen was fed through the ozone generator to give 2 wt% ozone at an ozone flowrate of 100 g/hr.

Solvent within the reservoir, reactor column and absorber column was controlled at, respectively, 15° c., 0° C., and −25° C.

As soon as equilibrium conditions were obtained, product consisting of 6 wt% $N_2O_5$ and less than 0.5% nitric acid in dichloromethane was taken continuously from the absorber column at a rate of 1.8 kg/hr.

The temperature of the absorber column was controlled at −25° C. necessitating additional solvent vapour recovery from the spent gas stream. The higher absorber temperature had the additional advantage that it suppressed the formation of an $N_2O_5$ slurry in the absorber solvent which could otherwise block the pump 20 and line 24.

C. CONTINUOUS WITH VALVE 50 OPEN

Process Description

1. Process steps 1 to 6 of the batch (semi-continuous) process are performed as described above, except that valve 28 remains shut, valve 50 si kept open, and product is taken off continuously through line 26 with valve 30 open.

2. the absorber column may be operated at a low temperature (typically −50° C.) at which an $N_2O_5$ slurry will form, but since the slurry flows into the warmer absorber column it dissolves and so the product taken from the reactor column contains only dissolved $N_2O_5$. Since any nitric acid formed in the process can only be removed with product, it is highly desirable that the oxygen source supplies dry, essentially moisture-free oxygen to the ozone generator.

EXAMPLE 3

Continuous with valve 50 Open

Process conditions were identical to those of example 2, except that the flow of make-up solvent through line 36 was reduced to increase the concentration of $N_2O_5$ in the product (now taken from the reaction column) from 6 wt% to 12 wt% now made possible by the higher temperature of, hence higher $N_2O_5$ solubility within, the product solvent.

We claim:

1. Process for preparing $N_2O_5$ comprising the steps of:
   (a) providing a solution of $N_2O_4$ in a first body of a volatile inert organic solvent,
   (b) contacting the solution with a carrier gas containing ozone at a temperature sufficient to promote formation of $N_2O_5$ in, and evaporation of solvent into, the carrier gas,
   (c) contacting the $N_2O_5$-laden carrier gas with a second body of inert organic solvent at a temperature below that of step (b) to condense the $N_2O_5$ therein, and
   (d) recovering the condensed $N_2O_5$ within the solvent from step (c).

2. Process according to claim 1 wherein the chemical identity of the first and second bodies of inert organic solvent are the same.

3. Process according to claim 1 wherein the solvent of the first and/or second bodies of solvent comprises a $C_1$ or $C_2$ chloroalkane or a chlorofluorocarbon.

4. Process according to claim 1 wherein the carrier gas employed in step (b) contains a stoichiometric excess of ozone over that required to react with the $N_2O_4$.

5. Process according of claim 4 wherein the carrier gas contains a stoichiometric excess of ozone of up to 5%.

6. A process according to claim 1 wherein step (b) is performed within the temperature range of −20° C. to +30° C.

7. Process according to claim 1 wherein step (c) is performed within the temperature range of −15° C. to −70° C.

8. Process according to claim 7 wherein step (c) is performed within the temperature range −20° C. to −50° C.

9. Process according to claim 1 wherein the solvent product of step (d) is blended with at least part of the solvent product of step (b).

10. Process according to claim 1 wherein each of the first body of solvent and carrier gas is provided as a separate stream.

11. Process according to claim 10 wherein the carrier gas and first body of solvent are contacted in step (b) in co-current flow.

12. Process according to claim 10 wherein the first body of solvent is recirculated.

13. Process according of claim 10 wherein the second body of solvent is provided as a separate stream.

14. Process according to claim 13 wherein the carrier gas and second body of solvent are contacted in step (c) in countercurrent flow.

15. Process according to claim 13 wherein the second body of solvent is recirculated.

16. Process according to claim 1 wherein the concentration of $N_2O_4$ in the first body of solvent employed in step (b) is rom 0.005 to 0.05 wt%.

17. Process according to claim 6, wherein step (b) is performed within the temperature range of −15° C. to +20° C.

* * * * *